UNITED STATES PATENT OFFICE.

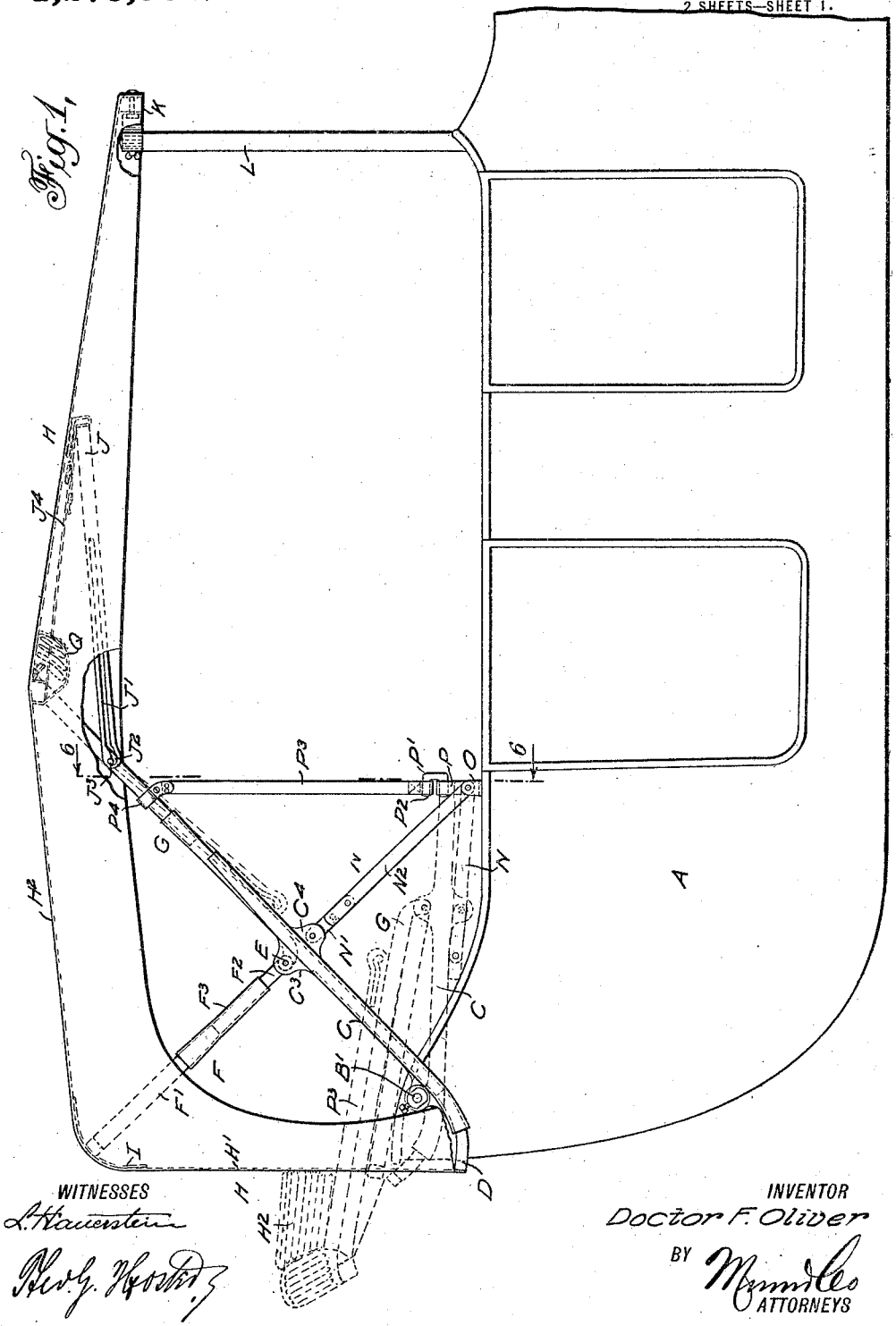

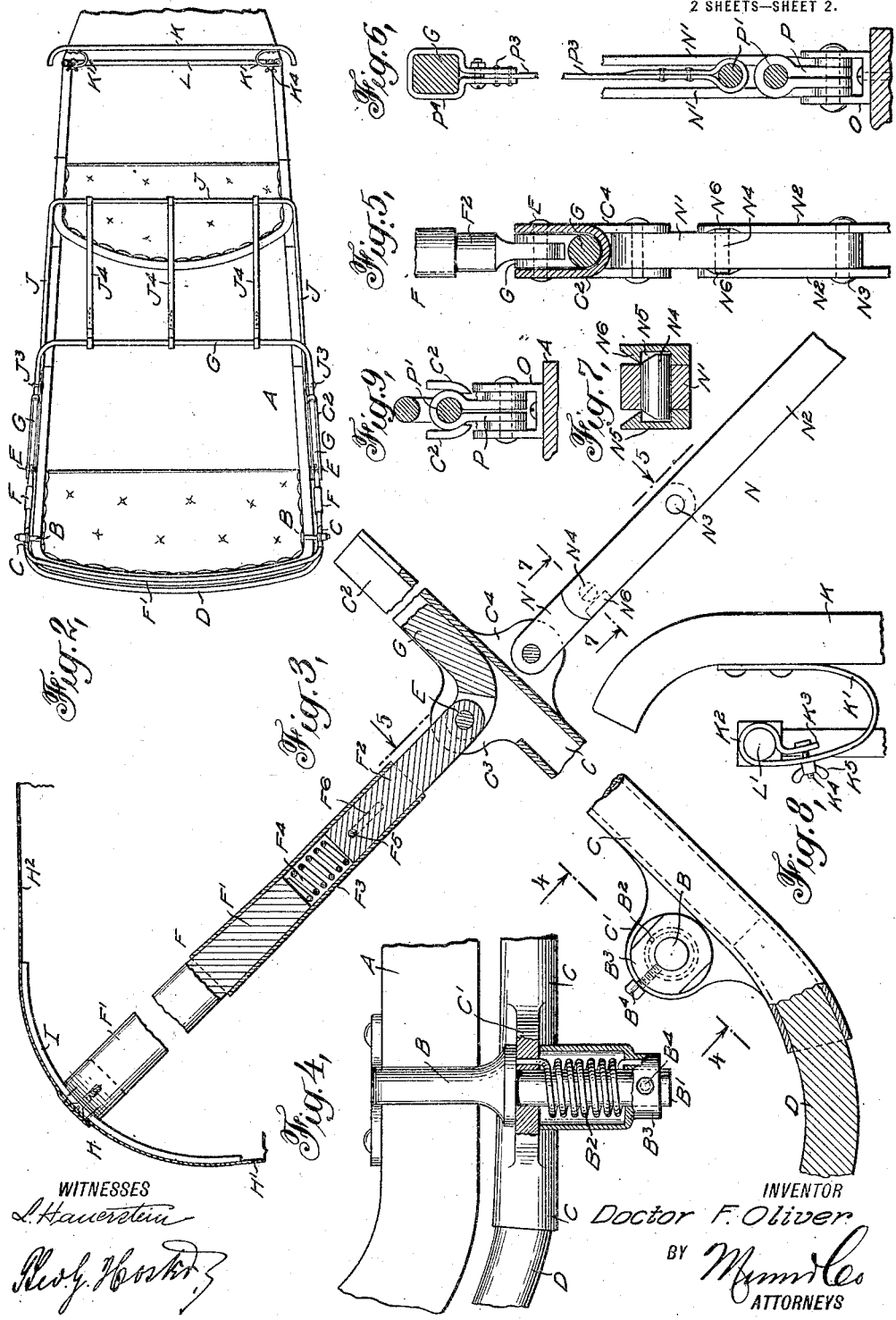

DOCTOR FRANKLIN OLIVER, OF OAKLAND, CALIFORNIA; LILLIE F. OLIVER EXECUTRIX OF SAID D. FRANKLIN OLIVER, DECEASED.

VEHICLE-TOP.

1,275,981. Specification of Letters Patent. Patented Aug. 13, 1918.

Application filed July 21, 1915, Serial No. 41,083. Renewed April 26, 1918. Serial No. 230,998.

*To all whom it may concern:*

Be it known that I, DOCTOR FRANKLIN OLIVER, a citizen of the United States, and a resident of Oakland, in the county of Alameda and State of California, have invented a new and Improved Vehicle-Top, of which the following is a full, clear, and exact description.

The invention relates to vehicle tops and the object of the present invention is to provide a new and improved vehicle top, more especially designed for use on standard bodies of automobiles and like vehicles and arranged to keep the cover properly stretched under different weather conditions, to allow for expansion and contraction, and to permit the operator to easily and quickly raise or lower the top or extend the rear portion only over the rear part of the vehicle, while the front part is folded to be out of the way of the occupants of the vehicle.

In order to produce the desired result, use is made of spring-pressed side arms pivoted intermediate their ends on the sides of the vehicle body, a back bow attached to the rear ends of the said side arms, a yielding rear top bow fulcrumed on the said side arms, and a cover extending from the said back bow over the rear top bow to the said middle bow.

A practical embodiment of the invention is represented in the accompanying drawings forming a part of this specification, in which similar characters of reference indicate corresponding parts in all the views.

Figure 1 is a side elevation of the vehicle body in extended position and as applied to a standard automobile body, parts being shown broken out;

Fig. 2 is a reduced plan view of the same with the cover omitted, and portions of the rear top bow broken out;

Fig. 3 is an enlarged sectional side elevation of one of the side arms and its connection with the back bow, the rear top bow, the middle bow and the brace for the side arm;

Fig. 4 is an enlarged sectional plan view of the pivotal connection of the side arm with the vehicle body;

Fig. 5 is a cross section of one of the side arms and its connection with the rear top bow, the middle bow and its brace, the section being on the line 5—5 of Fig. 3;

Fig. 6 is an enlarged transverse section of the vehicle top as applied, the section being on the line 6—6 of Fig. 1, and showing more particularly the brace for the middle bow;

Fig. 7 is an enlarged cross section of the locking device for locking the sections of the side arm brace in place, the section being on the line 7—7 of Fig. 3;

Fig. 8 is an enlarged plan view of the spring connection of the front bow or cross bar with the wind shield; and Fig. 9 is a cross section of the strap length in position on the bracket attached to the vehicle body, and with the split end of the side arm engaging the strap when in folded position.

On the sides of the vehicle body A and near the rear end thereof are secured brackets B provided with transverse pivots B' on which are mounted to swing lugs C' of side arms C, preferably made tubular for the reception at their rear ends of the sides of a back bow D extending around the back of the vehicle body A. The forward portions of the side arms C have their tops cut out to form channels $C^2$ and the rear ends of the side walls of the channels $C^2$ are extended upwardly to form lugs $C^3$ carrying transverse pivots E. On the pivots E are mounted to swing the sides of the rear top bow F and the sides of the middle bow G, the sides of the middle bow normally extending in the channels $C^2$ so as to limit their forward and downward swinging movement in the side arms, but to allow the middle bow to swing rearwardly into a folded position, as shown in dotted lines in Fig. 1. The cover H, of a suitable fabric material, is made in sections, of which the back section H' is secured at its lower edge to the back bow D and is fastened at its upper end to a spring plate I secured to the middle portion of the rear top bow F. The section $H^2$ of the cover H has its rear end attached to the plate I and then extends over the middle bow G and over an auxiliary bow J to connect with a front bow or cross bar K detachably mounted on the upper end of the frame of the wind shield L of the automobile.

The side arms C are provided, at the under side directly opposite the lugs $C^3$, with lugs $C^4$ pivotally connected by sectional links N with brackets O attached to the vehicle body A adjacent the rear portion thereof, as plainly indicated in Fig. 1. Each bracket O is provided with a short bearing P carrying a U-shaped link P' detachably engaged by the eye $P^2$ of the strap $P^3$ connected at its upper end with a bracket $P^4$ attached to the corresponding side arm of the middle bow G so as to hold the latter normally in a forwardly and upwardly inclined position, as indicated in Fig. 1. Each link N is made in two sections N', $N^2$ pivotally connected with each other by a pivot $N^3$, the link section $N^2$ being preferably formed of two bars extending beyond the pivot $N^3$ to engage opposite sides of the section N'. The section N' is provided with a locking pin $N^4$ (see Figs. 3, 5 and 7) adapted to engage recesses $N^5$ formed in the side bars of the section $N^2$, and which side bars have hooks $N^6$ to normally hold the ends of the pin $N^4$ in the recesses $N^5$, as shown in Fig. 7. The ends of the pin $N^4$ are slightly beveled to permit of disengaging the pin $N^4$ from the recesses $N^5$ and hooks $N^6$ on exerting a downward and rearward pressure on the section $N^2$ thus opening the sections N' and $N^2$ and allowing the same to fold into the position shown in dotted lines in Fig. 1. It is understood that when the link N is folded a downward swinging motion is given to the forward part of the side arms C while the back bow D is lifted to relax the section H' of the cover H.

The side arms C are spring-pressed to cause the back bow D to exert a downward pull on the cover section H' to hold the latter taut. For the purpose mentioned, use is made of a spring $B^2$ coiled on the pivot pin B' and attached at one end to the lug C' of the corresponding side arm C, while the other end of the spring $B^2$ is attached to a collar $B^3$ secured on the outer end of the pivot B' by a set screw $B^4$. On loosening the set screw $B^4$ and turning the collar $B^3$ the tension of the spring $B^2$ may be increased or decreased as desired. The sides of the collar $B^3$ are flattened, as plainly indicated in Fig. 3, to allow the application of a wrench or other tool for turning the collar when changing the tension of the spring $B^2$, as above explained.

The rear top bow F has its side arms made in sections F', $F^2$, of which the section $F^2$ is mounted to slide in a sleeve $F^3$ secured on the other section F' (see Fig. 3). A spring $F^4$ is arranged within the sleeve $F^3$ and engages with its ends the sections F', $F^2$ so as to hold the section F' yieldingly on the section $F^2$, thus compensating for any strain that may be exerted by the cover H on the outer section F' of the rear top bow. A pin $F^5$ extends through the section $F^2$ into slots $F^6$ formed in the sleeve $F^3$ to limit the sliding movement of the sleeve $F^3$ relative to the section $F^2$ fulcrumed on the pivot E.

The auxiliary bow J is provided at each side with a slot J' terminating in a seat $J^2$ engaging a pin $J^3$ on the corresponding side of the middle bow G to allow of holding the bow J either in the extended position shown in Fig. 1, or in folded position, as indicated in dotted lines in Fig. 1. The bow J is held inclined in an upward and forward direction by the use of straps $J^4$ connecting the middle portion of the middle bow G and the auxiliary bow J with each other, as plainly indicated in dotted lines in Fig. 1 and in full lines in Fig. 2. The straps $J^4$ are made adjustable, that is, provided with the usual buckles, indicated in Fig. 1, to permit of swinging the auxiliary bow J into a higher or lower position relative to the cover H to properly support the latter intermediate the middle bow G and the front bow K.

The front bow or crossbar K is provided with U-shaped flat springs K', each terminating in an eye or loop $K^2$, fitting removably onto a vertical stud L' formed on the upper end of the frame of the wind shield L (see Figs. 1, 2 and 8). The free end $K^3$ of each spring K' is extended beyond the eye $K^2$ and this end is engaged by a clamping screw $K^4$ held on the spring K' and serving to clamp the eye $K^2$ firmly in position on the stud L'. The bolt $K^4$ is preferably provided with a wing nut $K^5$ which can be readily unscrewed to release the eye $K^2$ from the stud L' with a view to permit the operator to disengage the eye from the stud whenever it is desired to fold up the front portion of the cover H on the front bow or crossbar K and to attach the folded-up cover and front bow, by suitable straps, to the middle bow G whenever it is desired to extend the cover over the rear portion only or leave the front portion of the body A uncovered.

It will be noticed that when the cover H is in extended position, it is held taut by the yieldingly mounted back bow D, the yieldingly mounted section F' of the rear top bow F and the yieldingly mounted front bow or crossbar K so that any expansion or contraction is compensated for and the cover is at all times kept taut. From the foregoing, it will be seen that by the arrangement described no roof straps are required, and all padding, usually employed to take care of sagging of the cover, is dispensed with. In case any expansion or shrinkage in the cover takes place owing to the different weather conditions, such change is taken care of by the yieldingly mounted bows, as above described.

In order to lower the vehicle top, the operator first opens the sections N', $N^2$ of the links N to swing the forward ends of the side arms C downward, thus pulling the middle bow G and with it the auxiliary bow J downward to slacken the top section H² of the cover H. As soon as the cover section H² has slackened, the operator can readily detach the front bow or crossbar K from the frame of the wind shield L, as previously described. The operator next disengages the seats J² of the auxiliary bow J from the pins J³ to allow the middle bow to slide downward with the pins J³ sliding in the slots J'. When this has been done, the forward portion H² of the cover H is rolled up on the front bow K and attached with the latter to the bow G by suitable straps Q on the bow G (see dotted lines in Fig. 1). The operator now swings the bows F and G rearwardly and downwardly into the position indicated in dotted lines in Fig. 1, to fold up the back sections H' of the cover H as well as the rear portion of the top section H² of the cover H. The bows are then inclosed in the usual envelop provided for this purpose. The free forward end of the channel C² of each side arm C is preferably split to clampingly engage the top of the bearing P, as plainly indicated in Fig. 9, thus holding the side arms against accidental movement while the vehicle top is in folded position.

Having thus described my invention, I claim as new and desire to secure by Letters Patent:

1. A vehicle top, comprising side arms mounted to swing on the sides of the vehicle, a middle bow mounted to swing on the said arms at a point intermediate one end of the arms and the fulcrums thereof, the middle bow being adapted to rest on the said ends of the side arms, a rear top bow fulcrumed on the said side arms, a back bow rigidly attached to the said arms, and a covering attached at one end to the said back bow and extending over the said rear top bow to connect with the said middle bow.

2. A vehicle top, comprising side arms mounted to swing on the sides of the vehicle, a middle bow mounted to swing on the said arms at a point intermediate one end of the arms and the fulcrums thereof, the middle bow being adapted to rest on the said ends of the side arms, a rear top bow fulcrumed on the said side arms, a back bow rigidly attached to the side arms, braces pivotally connecting the said side arms with the vehicle body at points forward of the fulcrums of the said side arms, approximately vertical braces connecting the said middle bow with the vehicle body, and a covering attached at one end to the said back bow and extending over the said rear top bow to connect with the said middle bow.

3. A vehicle top, comprising side arms mounted to swing on the sides of the vehicle, a middle bow mounted to swing on the said arms at a point intermediate one end of the arms and the fulcrums thereof, the middle bow being adapted to rest on the said ends of the side arms, a rear top bow fulcrumed on the said side arms and made in sections yieldingly connected with each other, a back bow rigidly attached to the said arms, and a covering attached at one end to the said back bow and extending over the said rear top bow to connect with the said middle bow.

4. A vehicle top, comprising side arms mounted to swing on the sides of the vehicle, a middle bow mounted to swing on the said arms at a point intermediate one end of the arms and the fulcrums thereof, the middle bow being adapted to rest on the said ends of the side arms, a rear top bow fulcrumed on the said side arms and made in sections yieldingly connected with each other, a spring plate attached to the said rear top bow and extending beyond the same in a forward and rearward direction, a back bow rigidly attached to the said side arms, and a cover made in sections, of which one is the back section and the other the top section, the said back section of the cover being attached at one end to the said back bow and at the other end to the said spring plate and the said top section of the cover being attached at one end to the said spring plate and at its other end to the middle bow.

5. A vehicle top, comprising side arms pivoted intermediate their ends on the sides of the vehicle body, a back bow attached to the rear ends of the said side arms, a middle bow attached to the forward ends of the said side arms, a yielding rear top bow fulcrumed on the said side arms, and a cover extending from the said back bow over the rear top bow to the said middle bow.

6. A vehicle top, comprising side arms pivoted intermediate their ends on the sides of the vehicle body, a back bow attached to the rear ends of the said side arms, a middle bow attached to the forward ends of the said side arms, a yielding rear top bow fulcrumed on the said side arms, a front bow having a yielding support engaging the wind shield of the vehicle, an intermediate bow fulcrumed on the said middle bow and extending upwardly and forwardly intermediate the said middle and front bows, and a cover extending over the said bows, the rear cover end being attached to the said back bow and the front cover end being attached to the said front bow.

7. A vehicle top, comprising side arms pivoted intermediate their ends on the sides of the vehicle body, a back bow attached to the rear ends of the said side arms, a middle bow attached to the forward ends of the said side arms, a yielding rear top bow fulcrumed on the said side arms, braces connecting the said side arms with the vehicle body, braces connecting the said middle bow with the vehicle body, and a cover extending from the said back bow over the rear top bow to the said middle bow.

8. A vehicle top, comprising side arms pivoted intermediate their ends on the sides of the vehicle body, a back bow attached to the rear ends of the said side arms, a middle bow attached to the forward ends of the said side arms, a yielding rear top bow fulcrumed on the said side arms, a front bow having a yielding detachable connection with the wind shield of the vehicle body, and a cover extending from the said back bow over the rear top bow to the said middle bow.

9. A vehicle top, comprising side arms mounted to swing on the sides of the vehicle body, a back bow attached to said side arms, a yieldingly mounted rear top bow fulcrumed on the side arms, a middle bow mounted to swing on the side arms, a front bow yieldingly connected with the wind shield of the vehicle body, and a cover attached to the said back and front bows and extending over the said rear top bow and the said middle bow.

10. A vehicle top, comprising side arms mounted to swing on the sides of the vehicle, a middle bow mounted to swing on the said arms at a point intermediate one end of the arms and the fulcrums thereof, the middle bow being adapted to rest on the said ends of the side arms, a rear top bow fulcrumed on the said side arms, a back bow rigidly attached to the said arms, torsion springs, adjustable means connecting the said torsion springs with the said side arms, and a covering attached at one end to the said back bow and extending over the said rear top bow to connect with the said middle bow.

11. In combination, a vehicle body provided with a wind shield having a frame, studs on the said frame, a front bow, and flat springs attached to the front bow and having eyes detachably engaging the said studs.

12. In combination, a vehicle body provided with a wind shield having a frame, studs on the said frame, a front bow, flat springs attached to the front bow and having eyes detachably engaging the said studs, the free end of each spring being extended beyond the eye, and a bolt engaging the said spring and its extended free end to permit of clamping the eyes in place on the corresponding stud.

13. The combination with a vehicle body, of tubular and spring pressed side arms fulcrumed adjacent their rear ends on the sides of the vehicle body, a back bow having its sides engaging the rear ends of the said side arms, pivots carried by the forward portions of said side arms, a middle bow and a yieldingly mounted rear top bow mounted to swing on the said pivots of the side arms, and a cover extending from the said back bow over the rear top bow to the said middle bow.

14. In combination, a vehicle body, side arms pivoted adjacent their rear ends on the sides of the vehicle body, a back bow having its sides attached to the rear ends of the said side arms, a middle bow having its sides fulcrumed on the forward portions of the said side arms, a rear top bow fulcrumed on the side arms and made in sections yieldingly connected together, a front bow having a detachable spring connection with the wind shield of the vehicle, an intermediate bow fulcrumed on the said middle bow and adjustable on its fulcrum, the said intermediate bow extending upwardly and forwardly intermediate the middle and front bows, adjustable means connecting the middle portions of the middle and intermediate bows together, and a cover extending over the said bows from the back bow to the front bow.

In testimony whereof I have signed my name to this specification in the presence of two subscribing witnesses.

DOCTOR FRANKLIN OLIVER.

Witnesses:
   FANNIE MANDERBACH,
   ANNETTE MARKHAM.

Copies of this patent may be obtained for five cents each, by addressing the "Commissioner of Patents, Washington, D. C."